March 22, 1938.  O. FOX  2,111,560

COMBINED DIAPHRAGM VALVE AND PRESSURE REGULATOR

Filed June 20, 1936

INVENTOR.
OTTO FOX
BY Kwis, Hudson & Kent
ATTORNEYS.

Patented Mar. 22, 1938

2,111,560

UNITED STATES PATENT OFFICE 2,111,560

COMBINED DIAPHRAGM VALVE AND PRESSURE REGULATOR

Otto Fox, Cleveland, Ohio, assignor to The Bryant Heater Company, Cleveland, Ohio, a corporation of Ohio Application June 20, 1936, Serial No. 86,389

3 Claims. (Cl. 50—4)

This invention relates to a combined diaphragm valve and pressure regulator for apparatus supplying fluid under pressure, and has particular reference to a combined diaphragm valve and pressure regulator for use with gas burning apparatus such as boilers, furnaces, heaters, and the like.

Heretofore the valve and regulator have been separate and independently operated parts or pieces of equipment, and it is the object of the present invention to embody or incorporate both parts into a single unit with the diaphragm, which has heretofore been utilized only to close or open the valve, serving the additional function of shifting a pressure regulating member so as to maintain the pressure of the gas or other fluid substantially constant.

The invention may be briefly summarized as consisting in certain novel details of construction and combinations and arrangements of parts which will be described in the specification and set forth in the appended claims.

In the accompanying sheet of drawings wherein I have shown two slightly different forms of my invention which operate satisfactorily, Fig. 1 is a plan view of a combined valve and regulator made in accordance with one form of my invention;

Figure 1:
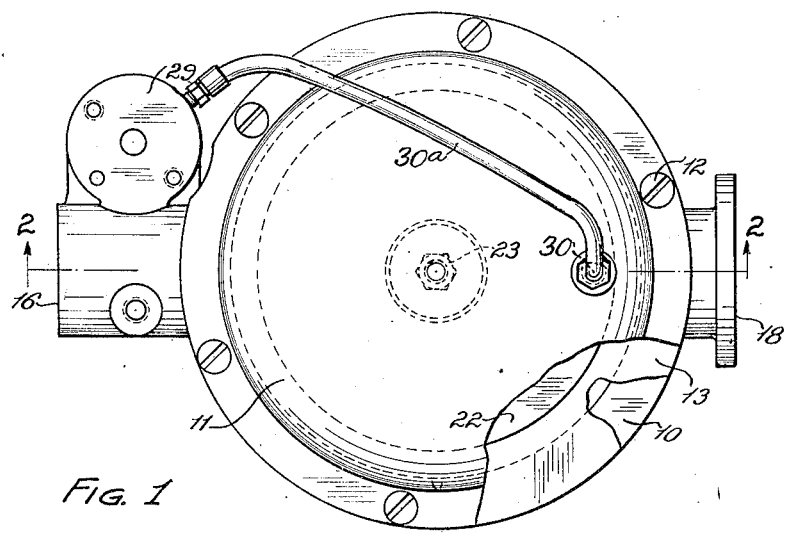

The combined valve and regulator of Fig. 1 includes a casing with a body portion 10 and a cap 11 secured thereto by screws 12 or otherwise. Clamped between an annular flange of the body portion 10 and a similar flange of the cap 11 is a diaphragm 13 above which is a chamber 14 to which pressure is adapted to be supplied or from which it is adapted to be exhausted. For convenience of description, it will be assumed that this combined valve and regulator is used for supplying gas to gas-consuming equipment, such as the burner of a boiler, furnace, or the like, and therefore that gas is the medium which is passed through the device and is supplied to or exhausted from the upper chamber 14. Beneath the diaphragm there are two chambers, namely, an inlet chamber 15 to which a gas supply pipe may be connected at 16 and a chamber 17 to which a gas delivery pipe may be connected at 18. Between these two chambers 15 and 17 there is a passageway 19, and surrounding this passageway is an annular upstanding valve seat 20 which is adapted to be engaged by a suitably formed seating member 21 in the form of a disk or annulus which is carried by the lower side of the diaphragm 13.

It is desirable that the upward movement of the diaphragm due to the exhausting of gas from the upper chamber 14 be resisted by suitable means which in this instance consists of a weight 22 in the form of a flat disk which is secured to the center of the diaphragm by a nut 23 which is screwed onto the upper end of a stem 24 passing centrally through the weight 22, the diaphragm 13, and the orifice 19. Near the lower end of this stem there is provided a throttling valve member 25 which, when the main valve is closed by the engagement of the annulus carried by the lower side of the diaphragm with the seat 20, engages and rests upon a boss 26 formed in the lower part of the chamber 15 and made hollow so as to receive with a guiding action the lower end of the stem 24 so that the load of the weight 22 will be transmitted to the boss 26 and the diaphragm will be relieved thereof. The throttling valve member 25 has a tapered periphery and screwed into the orifice 19 is a threaded sleeve 27 with a tapered lower end 28 adapted to receive the tapered portion of the valve member 25.

When a diaphragm valve is used with gas consuming apparatus, an auxiliary valve, usually a solenoid valve, is employed to automatically control the supply of gas pressure to and the bleeding of gas pressure from the upper chamber 14. The details of this auxiliary valve are not important to the present invention and the same is indicated more or less conventionally at 29. Passageways or small auxiliary piping of any kind may be employed between the auxiliary valve and the upper chamber 14, but in this instance I have shown a pipe 30a (Fig. 1) extending between the valve 29 and the chamber 14, the connection being made with the chamber 14 through a threaded opening 30 (Fig. 2) extending through the cap 11.

Figure 2:
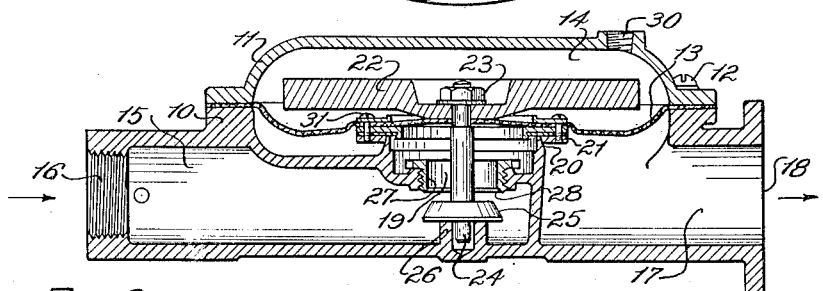
Fig. 2 is a transverse sectional view substantially along the line 2—2 of Fig. 1.

In operation, when pressure is supplied to the upper chamber 14, the valve is closed with the diaphragm, the weight, and the throttle valve in the positions shown in Fig. 2. However, when the pressure is bled from the upper chamber 14 through the action of the auxiliary valve or otherwise, the seating portion of the diaphragm lifts from the seat but during the initial movement the weight 22 is not elevated. The initial unseating allows the gas pressure to build up under the entire lower surface of the diaphragm, and after this initial lifting of the diaphragm, the metal parts on the seating portion of the diaphragm, in this instance the heads of screws 31, engage the weight and lift it. The weight is thus lifted without imposing any material stress on the diaphragm. As the weight is lifted, the throttling or pressure regulating valve member 25 enters more or less in the sleeve 19 to a predetermined position, after which the weight and the diaphragm float in a substantially fixed position so long as the gas pressure remains steady, but if the pressure increases, the further lifting of the diaphragm and weight causes the valve member 25 to more closely approach the tapered seat 28 and thus throttle the pressure. Conversely, if the gas pressure drops, the weight and the diaphragm are lowered and the valve 25 is also lowered from the tapered seat 28 allowing the gas to flow more freely through the orifice 19 and out by way of the said outlet 18. Accordingly, the pressure and the volume of gas on the delivery side of the valve are maintained substantially constant.

When the valve is to be closed, gas pressure is again supplied to the upper chamber 14, whereupon the diaphragm and the weight are lowered until the seating portion of the diaphragm reengages the seat 20, thus completely shutting off the flow of gas.

Figure 3:
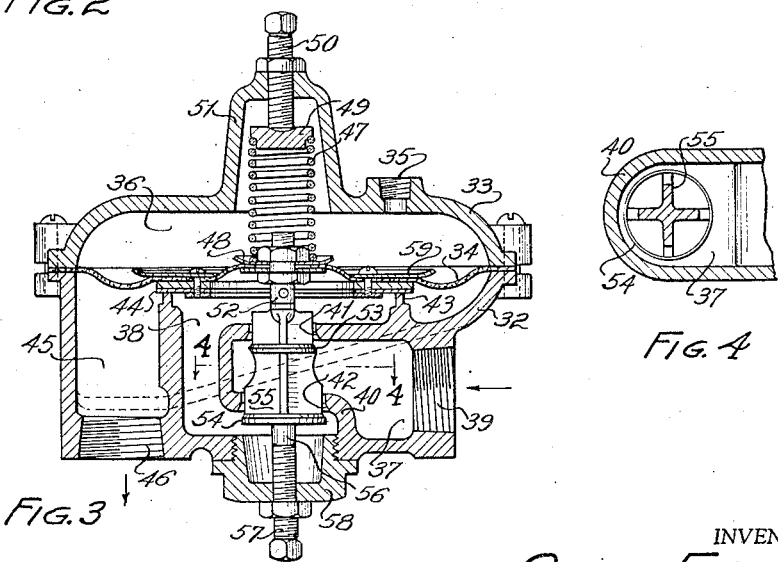
Fig. 3 is a similar view showing a modification.
Figure 4:
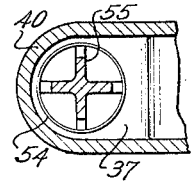
Fig. 4 is a detail sectional view substantially along the line 4—4 of Fig. 3.

In Fig. 3 I have shown a somewhat different construction but one which involves the principle of that first described. In this figure the body portion of the casing is designated 32, and between the periphery of the body portion and the periphery of the cap 33 the diaphragm 34 is clamped as before. The cap is provided with the necessary opening 35 by which pressure is supplied to or bled from the upper chamber 36, but for the sake of simplicity the control valve which causes pressure to be supplied to or exhausted from the chamber 36 is omitted.

Beneath the diaphragm there is an inlet or pressure chamber composed in this instance of two portions 37 and 38, the portion 37 having an inlet 39 for the gas supply and being separated from the portion 38 of the pressure chamber by a wall 40 in which are two vertically aligned orifices 41 and 42 the lower portions of which are tapered. The portion 38 of the inlet chamber has at the top an annular seat 43 which is adapted to be engaged by a diaphragm disk or seating portion 44. Also beneath the diaphragm and surrounding the annular seat 43 is the outlet chamber 45 with an outlet 46 to receive the end of the pipe which delivers gas to the main burner or burners.

In this instance the upward movement of the diaphragm is yieldingly resisted by a coil spring 47 which is the substantial equivalent of the weight 22 of the first described construction. This spring at its lower end bears against a disk 48 on the top surface of the diaphragm, and at the center thereof and at its upper end bears against a seat 49 the normal position of which and accordingly the resisting effect of the spring can be adjusted by a setscrew 50 and associated lock nut. The cap 33 is provided in the center with an upstanding hollow boss 51 into which the spring extends, and the top of this boss is threaded to receive the setscrew 50.

Secured to the central part of the diaphragm and extending downwardly therefrom is a valve stem 52 which carries a throttle or pressure regulating valve member which operates in the two aligned orifices 41 and 42 in the wall 40 and includes two valve disks 53 and 54 with tapered upper portions which are adapted to cooperate with the tapered lower portions of the orifices 41 and 42. Above the disks 53 and 54 the valve member is skeletonized or ribbed as shown at 55, these portions acting as guides in the orifices 41 and 42 but having no restricting effect on the flow of gas through the orifices. The lower end of the throttling and pressure regulating valve member has an extension 56 which is adapted to engage the upper end of an adjustable setscrew 57 which extends through the bottom of a cap 58 which is threaded and screws into a threaded opening in the lower part of the bottom portion 32 of the casing opposite the orifices 41 and 42. The purpose of this cap is to facilitate the machining of the orifices and particularly the tapered portions which cooperate with the tapered portions of the valve disks 53 and 54.

When gas pressure is supplied to the upper chamber 36, the diaphragm is seated, as shown in Fig. 3, the extension 56 of the throttling valve member then engaging the upper end of the lower setscrew 57 so as to take the thrust of the spring 47 off the diaphragm. When the pressure is bled from the upper chamber 36, the gas pressure in the inlet chamber 38 on the lower central part of the diaphragm lifts it from its seat 43, whereupon the diaphragm straightens out and takes a given position, depending upon the pressure of gas beneath it, the spring 47 being compressed during this action. As the diaphragm lifts, the valve disks 53 and 54 approach the tapered portions of the orifices 41 and 42 and by the throttling effect limit the position which the diaphragm takes when the diaphragm is lifted and gas is flowing through the valve. As the pressure varies, the position of the pressure controlling valve member is shifted so as to more or less throttle the gas as before so as to maintain a substantially constant pressure on the delivery side of the valve. It is to be noted that gas entering the chamber 37 from the inlet 39 passes to the chamber 38 through both orifices 41 and 42.

The metal parts above the diaphragm including the disk 48 and the outer portion of a second disk 59 to which the seating portions of the diaphragm are secured are so shaped that as the diaphragm straightens out under the pressure of the gas beneath it there will be the least likelihood of injury to the diaphragm.

It will be understood, of course, that by adjusting the screw 50 and thus the effective strength of the spring 47, the maximum pressure which is delivered through the outlet 46 may be varied.

Thus it will be seen that I have provided a very effective and simple combined diaphragm valve and pressure regulator wherein the diaphragm functions so as to shut off or permit the flow of gas and at the same time it functions to actuate the throttling or pressure regulating valve member. Thus I eliminate the necessity for a separate pressure regulator and am thereby enabled to simplify and reduce the cost of the apparatus.

While I have shown two forms of my invention, I do not desire to be confined thereto as changes may be made without departing from the spirit and scope of my invention, and I therefore aim in my claims to cover all modifications which do not involve a departure from the invention in its broadest aspects.

Having thus described my invention, I claim:

1. A combined diaphragm valve and pressure regulator comprising a casing having inlet and outlet chambers, a valve opening surrounded by a valve seat and a regulator opening between said chambers, a diaphragm located at one side of said chambers and adapted to cooperate with said valve seat to establish or shut off communication therebetween, said diaphragm forming with said casing a chamber at one side of said diaphragm opposite said inlet and outlet chambers, valve controlled means for supplying fluid pressure to the last mentioned chamber to cause the seating of the diaphragm and for exhausting pressure from said chamber to cause its unseating, and a regulator valve member operatively connected to said diaphragm and cooperating with said regulator opening, said valve opening and said regulator opening being arranged so that gas flows through both openings in passing from the inlet chamber to the outlet chamber.

2. A combined diaphragm valve and pressure regulator comprising a casing having inlet and outlet chambers, a valve opening surrounded by a valve seat and a regulator opening between said chambers, a diaphragm located at one side of said chambers and adapted to cooperate with said valve seat to establish or shut off communication therebetween, said diaphragm forming with said casing a chamber at one side of said diaphragm opposite said inlet and outlet chambers, valve controlled means for supplying fluid pressure to the last mentioned chamber to cause the seating of said diaphragm and for exhausting pressure from said chamber to cause its unseating, a regulator valve member operatively connected to said diaphragm and cooperating with said regulator opening, and biasing means effective when the diaphragm valve is open for biasing said diaphragm toward closed position.

3. A combined diaphragm valve and pressure regulator comprising a casing having inlet and outlet chambers, a valve opening surrounded by a valve seat and a regulator opening between said chambers, a diaphragm located at one side of said chambers and adapted to cooperate with said valve seat to establish or shut off communication therebetween, said diaphragm forming with said casing a chamber at one side of said diaphragm opposite said inlet and outlet chambers, valve controlled means for supplying fluid pressure to the last mentioned chamber to cause the seating of said diaphragm and for exhausting pressure from said chamber to cause its unseating, a regulator valve member operatively connected to said diaphragm and cooperating with said regulator opening, biasing means effective when the diaphragm valve is open for biasing said diaphragm toward closed position, and means whereby the diaphragm is relieved of said biasing means when the diaphragm is at and adjacent closed position.

OTTO FOX.